(No Model.)  11 Sheets—Sheet 1.

H. A. YOUNG.
WIRE ROD REELING MACHINE.

No. 353,046.  Patented Nov. 23, 1886.

Fig. 1.

Witnesses:
Adelbert F. Mowry,
Walter B. Nourse,

Inventor:
Horace A. Young.
By H. A. Barker, Atty.

(No Model.)  11 Sheets—Sheet 2.
H. A. YOUNG.
WIRE ROD REELING MACHINE.
No. 353,046.  Patented Nov. 23, 1886.

(No Model.) 11 Sheets—Sheet 3.

H. A. YOUNG.
WIRE ROD REELING MACHINE.

No. 353,046. Patented Nov. 23, 1886.

Witnesses:
Adelbert F. Mowry
Walter B. Nourse

Inventor:
Horace A. Young
By A. A. Barker, Atty.

(No Model.) 11 Sheets—Sheet 4.

H. A. YOUNG.
WIRE ROD REELING MACHINE.

No. 353,046. Patented Nov. 23, 1886.

Witnesses:
Adelbert F. Mowry,
Walter B. Nourse.

Inventor:
Horace A. Young.
By A. A. Barker, Att'y.

(No Model.)  11 Sheets—Sheet 5.

H. A. YOUNG.
WIRE ROD REELING MACHINE.

No. 353,046.  Patented Nov. 23, 1886.

Witnesses:  Inventor;
Adelbert F. Mowry,  Horace A. Young.
Walter B. Nourse,  By A. A. Barker, Atty.

(No Model.) 11 Sheets—Sheet 6.

H. A. YOUNG.
WIRE ROD REELING MACHINE.

No. 353,046. Patented Nov. 23, 1886.

Witnesses:
Adelbert F. Mowry.
Walter B. Nourse.

Inventor:
Horace A. Young.
By A. A. Barker, Atty.

(No Model.)  H. A. YOUNG.  11 Sheets—Sheet 7.
WIRE ROD REELING MACHINE.

No. 353,046. Patented Nov. 23, 1886.

FIG. 12.

Witnesses:
Adelbert F. Mowry.
Walter B. Nourse,

Inventor:
Horace A. Young.
By A. A. Barker, Atty.

(No Model.)  
11 Sheets—Sheet 8.

H. A. YOUNG.
WIRE ROD REELING MACHINE.

No. 353,046.  Patented Nov. 23, 1886.

Witnesses:  
Adelbert F. Mowry.  
Walter B. Nourse.

Inventor:  
Horace A. Young.  
By A. A. Barker, Atty.

(No Model.) 11 Sheets—Sheet 9.

H. A. YOUNG.
WIRE ROD REELING MACHINE.

No. 353,046. Patented Nov. 23, 1886.

Witnesses:
Adelbert F. Mowry.
Walter B. Nourse.

Inventor:
Horace A. Young.
By A. A. Barker, Att'y.

(No Model.) 11 Sheets—Sheet 10.

H. A. YOUNG.
WIRE-ROD REELING MACHINE.

No. 353,046. Patented Nov. 23, 1886.

Witnesses:
Adelbert F. Mowry.
Walter B. Nourse.

Inventor:
Horace A. Young.
By A. A. Barker Atty.

(No Model.)  11 Sheets—Sheet 11.

H. A. YOUNG.
WIRE ROD REELING MACHINE.

No. 353,046.  Patented Nov. 23, 1886.

Witnesses:
Adelbert F. Mowry.
Walter B. Nourse.

Inventor:
Horace A. Young.
By A. A. Barker, Atty.

UNITED STATES PATENT OFFICE.

HORACE A. YOUNG, OF WORCESTER, MASSACHUSETTS.

WIRE-ROD-REELING MACHINE.

SPECIFICATION forming part of Letters Patent No. 353,046, dated November 23, 1886.

Application filed August 7, 1886. Serial No. 210,276. (No model.)

*To all whom it may concern:*

Be it known that I, HORACE A. YOUNG, of Worcester, in the county of Worcester and State of Massachusetts, have invented certain new and useful Improvements in Wire-Rod-Reeling-Machines; and I do hereby declare that the following is a full, clear, and exact description of the same, reference being had to the accompanying drawings, forming a part of this specification, and in which—

Figs. 10 to 18, inclusive, represent modifications of my invention, also hereinafter more fully described. Figs. 7, 8, and 9 are shown upon the same scale as Fig. 6, and the figures following upon the same scale as the figures prior to said Fig. 6.

My invention relates to machines for reeling or coiling wire rods. The object thereof is to provide a more efficient or convenient means for performing said operation; and it consists in constructing and arranging the machine so as to discharge the coiled-wire rods from the bottom thereof, as hereinafter set forth, instead of removing them from the top in the usual well-known way.

The main or essential feature of my invention comprises a series of hinged levers arranged in a circle, or substantially so, adapted to receive and hold the wire rods while said levers are in one position as said rods are delivered thereto and coiled thereon, and to discharge the rods at the bottom, after having been thus coiled, by moving the levers into another position, as hereinafter set forth. Various ways may be adopted for conducting the wire rods to said holding-levers, for keeping them in position as they are coiled thereon, and for operating the same to produce the results before stated, and I therefore do not limit myself to any special method.

I will first describe one method in detail, illustrated by the first nine figures of the drawings, and afterward, in a general way, other methods or modifications in the construction and arrangement thereof. (Shown by the rest of the figures in said drawings.)

Figure 5:
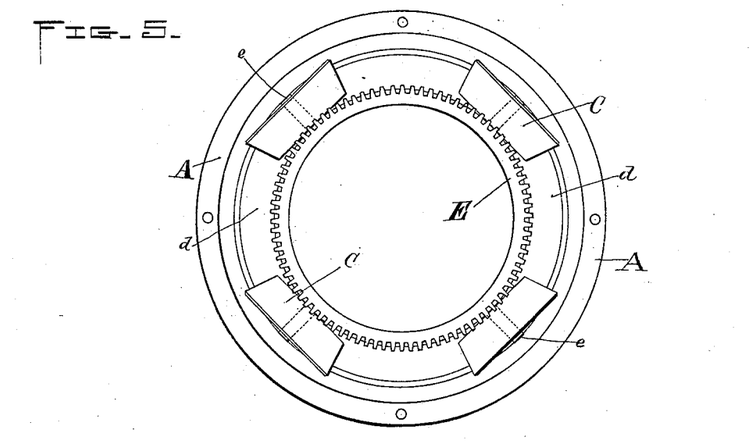
Fig. 5 is a top or plan view of the bottom casing of the machine and some of the operating parts arranged within the same.

The part marked A represents a stationary circular casing, which may be supported by means of the frame-work B or in any other suitable manner. Said casing is made with an inclined bearing surface or track, $d$, upon which the wheels C may travel, and is also provided with an irregular-shaped cover, D, over the top thereof. The wheels C, which in this instance are four in number, (see Fig. 5,) are fitted to turn on studs $e$, projecting radially from an inner casing, E, which is supported by said studs and wheels and has a rotary motion upon the track $d$ aforesaid. Said rotary motion is imparted to the inner casing, E, by means of a spur-gear, F, fastened on the vertical driving-shaft G, which engages with correspondingly-shaped teeth formed upon or secured to the outer side of said casing above the wheels C. (See Figs. 3 and 5.)

Although I prefer in practice to rotate the casing E for reasons hereinafter specified, I do not limit myself thereto, as a stationary casing may be used with good effect by a slight change in the construction of the machine, as will be seen by the modifications shown and hereinafter described.

The parts marked H are the wire-rod-holding levers previously referred to, which have a rotary as well as a vertical rocking motion imparted to them, one independent of the other, and in each case all the levers being operated together. Said levers are hinged at the points $f$ to the lower ends of hangers $g$, projecting down from a hub, $h$, formed or secured upon the lower end of the hollow shaft or sleeve $j$, and said sleeve is in turn fitted over the central vertical shaft, $k$. They may be keyed so as to turn together, and at the same time admit of the shaft working up and down in the sleeve, as hereinafter described. Said sleeve is supported and arranged to turn in a similar manner to the inner casing, E, previously described, being provided with wheels C', which travel on an inclined track, $d'$, as in the former instance, and said wheels are fitted to turn on studs at the outer ends of radial arms $e'$. (See Figs. 3 and 4.) The track $d'$ is formed upon an irregular-shaped base, $l$, and said track and the wheels are inclosed in a cover or casing, I, having the hub $m$ for holding the upper end of the sleeve $j$ in position, said sleeve being fitted to turn in said hub. The part $l$ and cover I are both stationary, and are fastened together by means of screws $n$.

Figure 3:
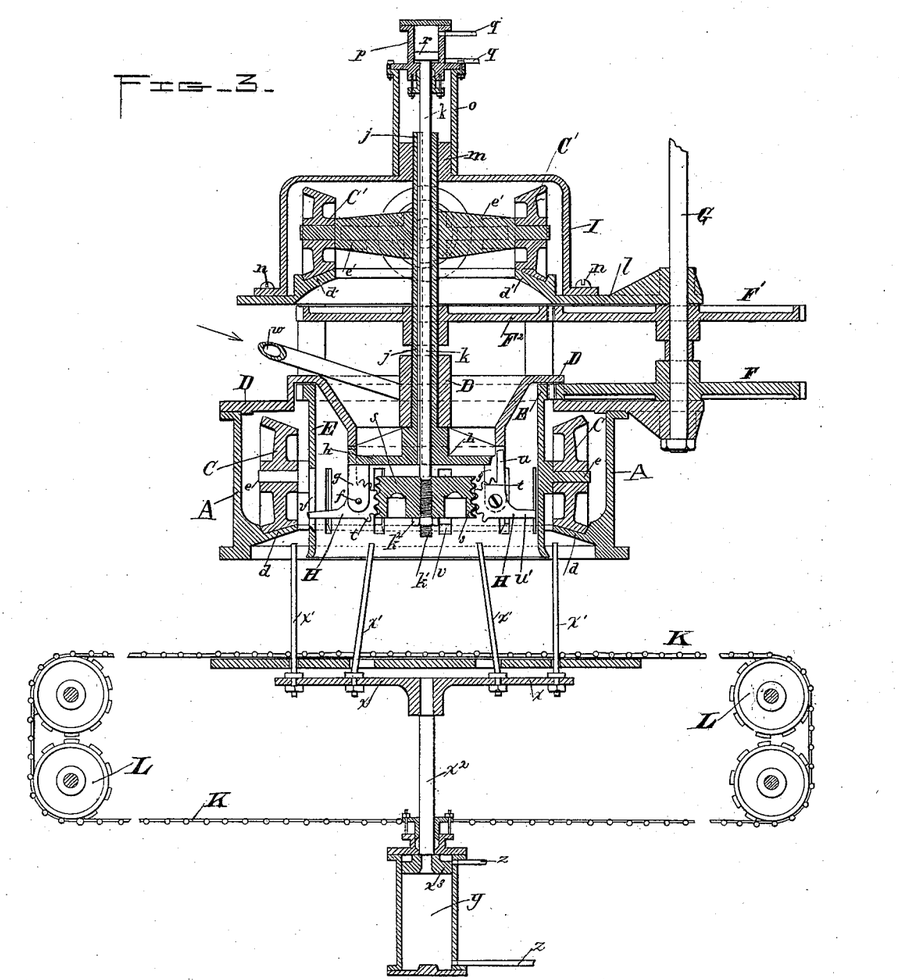
Fig. 3 is a central vertical section of the machine taken on line $a\ a$, Fig. 1, looking in the direction indicated by arrow $a'$, same figure.
Figure 4:
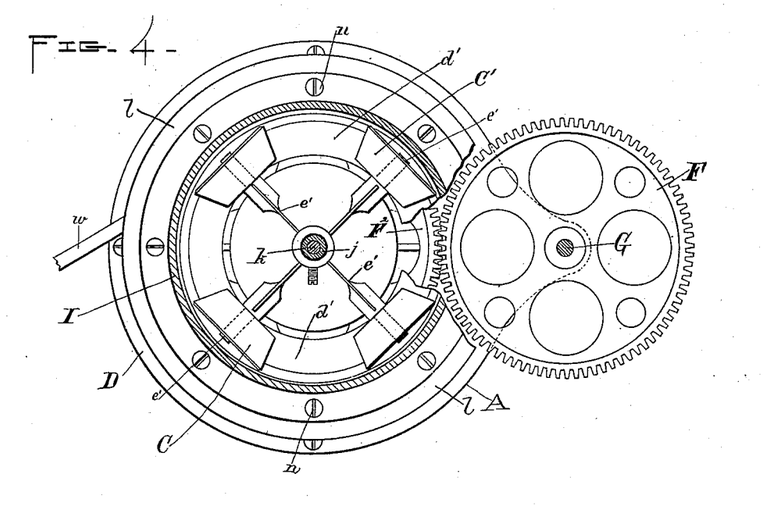
Fig. 4 is a horizontal section through the upper part of the machine taken on line $b\ b$, Fig. 2, looking in the direction of arrow $b'$, same figure, showing a plan view of parts of said machine, hereinafter more fully explained.

To the outer side of the hub $m$ a cylinder, $o$, is secured, at the upper end of which cylinder may be mounted an ordinary steam-cylinder, $p$, having the usual steam supply and exhaust pipes, $q$ $q$, and piston $r$. Said piston $r$ is formed upon or secured to the upper end of central vertical shaft, $k$. Therefore the latter acts as a piston-rod, and is raised and lowered by the operation of the piston in the usual way. If preferred, said shaft or piston-rod may be operated by hydraulic or any other suitable power in lieu of that above described. The purpose of thus operating the shaft $k$ is to raise and lower a toothed part, $s$, upon the lower end of said shaft, which engages with teeth $t$, formed on the inner sides of the levers H, just back of their pivots, thereby causing said levers to be turned a partial revolution up or down, according to the motion of the shaft $k$, the upward movement thereof causing the levers to be turned down and its downward movement to swing them up into their normal positions again, as shown in Fig. 3.

Figure 19:
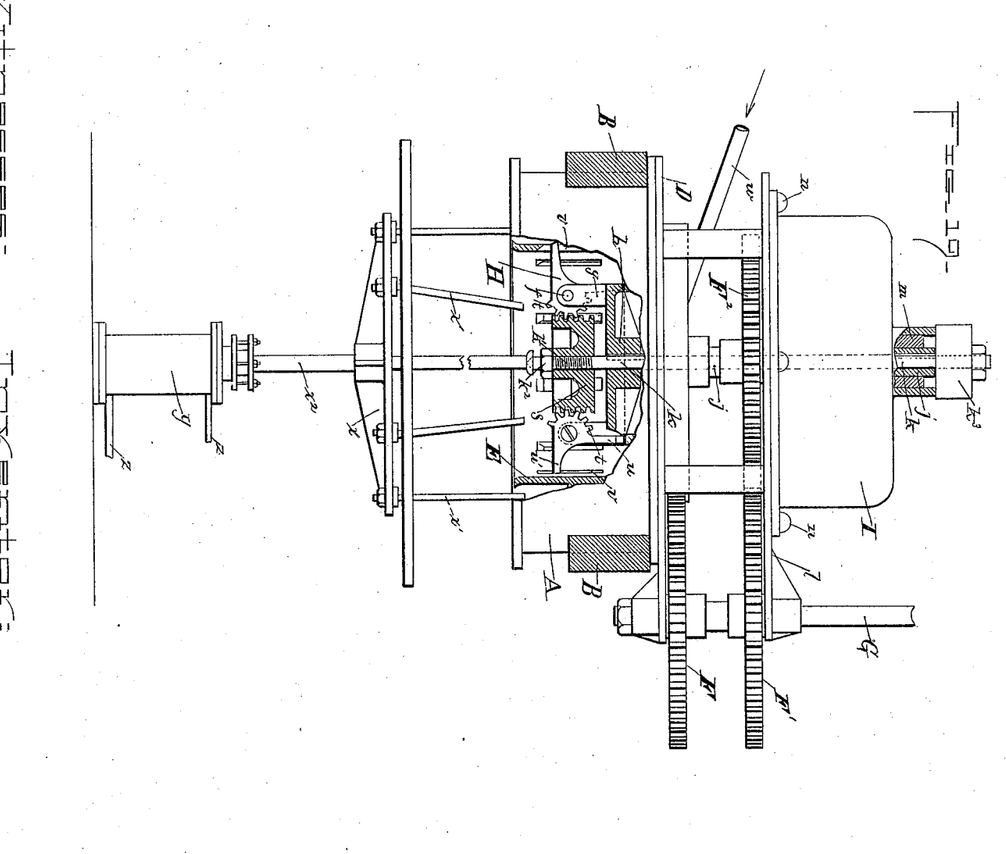
Fig. 19 represents a similar view to Fig. 3, partly in elevation and partly in section, showing a modification in the manner of moving the central vertical shaft of the machine and parts connected therewith up and down, to operate the wire-rod-holding levers, as hereinafter more fully specified.

I do not limit myself to the aforesaid method of raising and lowering the central shaft, $k$, as various ways may be employed to produce the same result—as, for instance, instead of drawing the shaft up from the top, as before described, it may be pushed up from the bottom in any suitable and convenient manner. In Fig. 19 I have shown a rod having a recess or cup-shaped opening at its upper end which receives the lower end of the shaft $k$, as shown by dotted lines, thus forming a supporting-bearing for said shaft, and consequently when said supporting-shaft is raised or lowered vertically a corresponding motion is imparted to the shaft $k$ and parts connected therewith, the weight of said shaft $k$ causing it to follow the supporting-shaft when the latter is lowered. To facilitate said operation, a weight, $k^3$, may be employed at the upper end of shaft $k$.

The supporting-shaft is preferably operated by hydraulic power; but I do not limit myself thereto, as other power may be employed to produce the same result. In addition to the foregoing the supporting-shaft serves another purpose, hereinafter described.

The levers H are each provided with two arms, $u$ $u'$, which occupy a vertical and horizontal position, respectively, when in their normal positions, as hereinbefore described.

The wire rods are deposited upon the arms $u'$, between the inner casing, E, and the arms $u$, and in order that said rods may be prevented from slipping down through at the outer ends of the arms $u'$ the latter are extended through vertical slots $v$, formed in said inner casing, as is shown in Fig. 3.

The toothed or corrugated part $s$ may be adjusted upon the shaft $k$ by turning it upon the threaded part $k'$ of said shaft, and then locking the same in its adjusted position by means of the nut $k^2$.

Driving-power is imparted to shaft $k$, sleeve $j$, and the parts connected therewith, so as to turn them all together at the same rate of speed as the inner casing, E, by means of a spur-gear, F', on shaft G, which meshes with another spur-gear, $F^2$, on the sleeve, said gears F' $F^2$ being of the same diameter and having the same number of teeth as those for driving said inner casing.

If preferred, the sleeve $j$ may be fitted to turn on shaft $k$, instead of being fastened so as to turn together, as previously described, in which case said shaft would have only vertical movements, and the teeth on the levers H would travel in the grooves between the corrugations or teeth of the part $s$ when in operation, said grooves and teeth being extended around said part horizontally.

The main shaft G is fitted to turn in suitable bearings, and may in practice be driven by power communicated to the same in any convenient manner.

Figures 6, 8, 9:
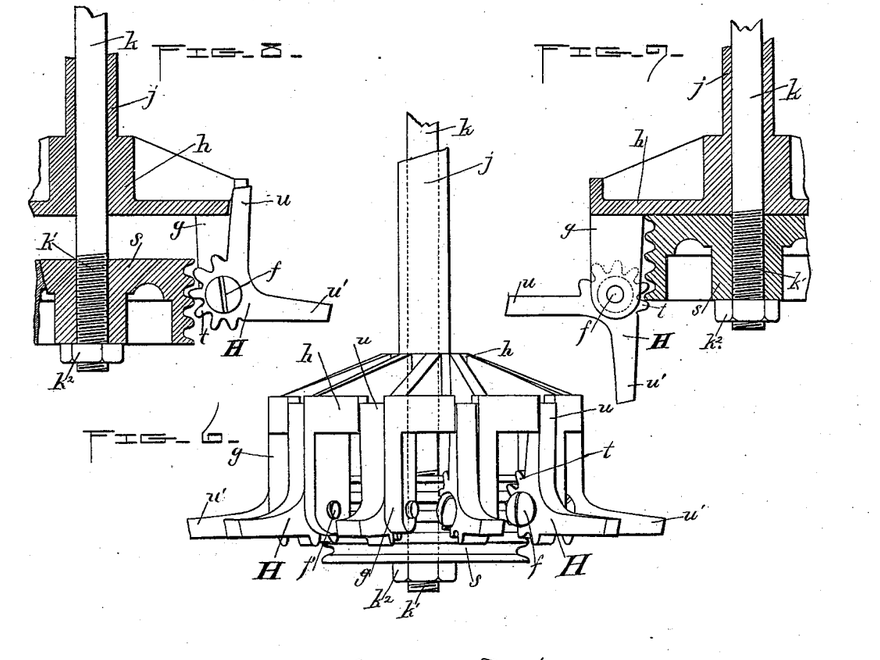
Fig. 6 represents upon an enlarged scale a side view of the wire-rod holding and discharge levers and adjacent parts operating therewith.
Figs. 8 and 9 are vertical central sections through said parts, taken on lines $c$ $c'$, respectively, Fig. 7, looking in the direction indicated by arrow $c^2$, same figure, in Fig. 8 the parts being shown with the levers above referred to in their normal positions ready to receive and hold the wire rod, and in Fig. 9 after having discharged said wire rod therefrom, as hereinafter more fully described.
Figure 7:
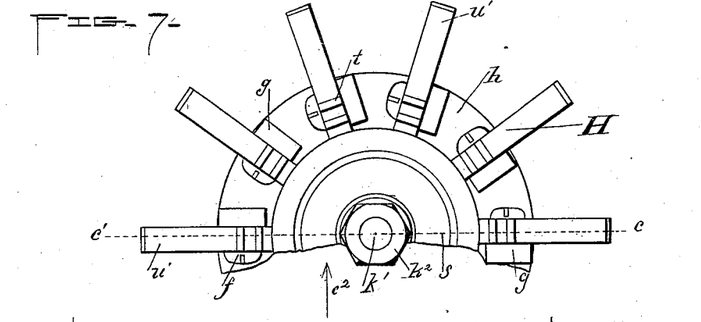
Fig. 7 is a half plan view of the parts shown in Fig. 6.

The wire rods are delivered to the reel through a conducting-pipe, $w$, which connects with an opening formed in the cover D, at an incline thereto, as shown in the drawings. As fast as deposited the rod is laid in a coil on the arms $u'$ of the holding-levers H by the rotation of the various parts, as hereinbefore described, their velocity being just sufficient to take up the wire and prevent its snarling or becoming entangled as it is delivered upon the arms. I rotate the inner casing, E, with the rod-holding levers not only for the reason previously stated, (of admitting of the arms $u'$ being extended out longer to better hold said rods,) but also to produce less friction upon the rods as they are being carried around on said arms $u'$ in the coiling operation. The upright arms $u$ of the holding-levers H also serve a double purpose—viz., that of holding the coil in position laterally upon its inner side, as before described, and to insure the proper discharge of the finished coil from the reel by bearing downward upon its top surface when swung down from the position shown in Fig. 8 to that of Fig. 9 in the manner previously explained.

Various methods may be employed for catching the finished coils as they are dropped out of the reel and for conveying them from under said reel. In this instance I have shown a horizontal plate or disk, $x$, having the upright spokes or arms $x'$ fastened thereto for catching and keeping the coils in position when thus dropped out. Said plate is secured to a vertical shaft, $x^2$, which may be used for the purpose of supporting the plate only, as shown in Fig. 3, or for the double purpose of supporting said plate as well as the shaft $k$, as previously described, and shown in Fig. 19. It may be operated in a similar manner to shafts for other purposes requiring vertical movements to be imparted to the same, or, in a similar manner, to raising and lowering the toothed part $s$ and shaft $k$ from above, as before described, the rod $x^2$ being connected to a piston, $x^3$, fitted in the cylinder $y$, which is provided with the usual pipes, $z\ z$, as in the former instance.

Figure 2:
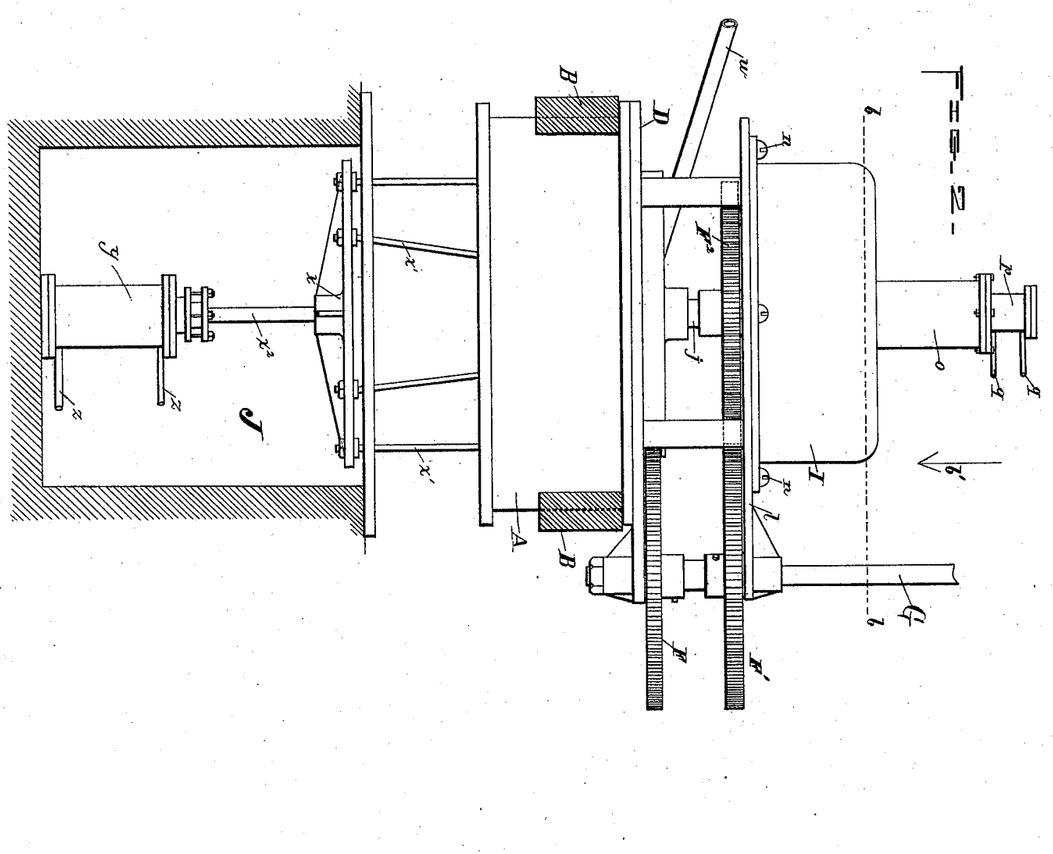
Fig. 2 is a side view thereof, showing its supporting frame-work and bed in section.

In practice I prefer to arrange the plate $x$ and its operating parts aforesaid in a pit, J, (see Fig. 2,) below the floor. The spokes $x'$ thereof are extended up through openings in said floor to just under the wire-rod-holding levers, as shown in Fig. 3, the space between the two rows of spokes being arranged to come under where the coils are discharged, so as to catch the latter between the same, and thus prevent them from uncoiling as they pass down out of the reel.

Figure 1:
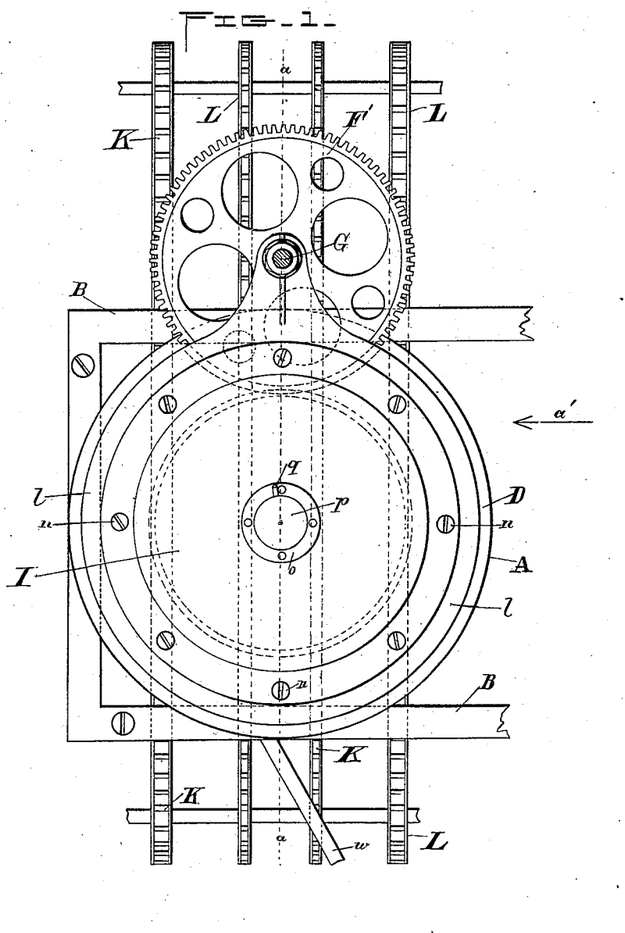
Figure 1 represents a top or plan view of a wire-rod-reeling machine embodying my improvements.

I convey the coils from under the reel by means of an endless chain, K, arranged to pass between the spokes $x'$ just over the top of the floor, as shown in Figs. 1 and 3. Said chain may be operated by passing the same around two or more toothed or sprocket wheels, L, in a similar manner to an ordinary pump-chain, the driving-wheels L being fastened to suitable shafts operated in any convenient and well-known manner.

In practice the motive power for raising and lowering the plate $x$ and its spokes, as well as that for operating the chain K, are both under control of the attendant, each being constructed and arranged to be started up and stopped independent of the other. As said mechanisms constitute no part of my invention, it will be unnecessary to further describe or illustrate the same in the drawings.

It is obvious that in order to convey the coils from under the reel, as before stated, the plate and its spokes aforesaid must necessarily be lowered so as to allow said coils to pass over the top ends of said spokes, after which they are again elevated into their normal positions preparatory to depositing the next coil, as previously described.

Although I prefer in practice to employ a conveying-chain, K, it is obvious that other means may be adopted, if desired, to produce the same result.

The operation of the machine may be briefly summed up as follows: Assuming that the various parts are in their normal positions ready for operation, the attendant starts the machine up ready to receive the incoming coil from the rolling-mill, which, passing through the conducting-pipe $w$, is laid in a coil on the hinged levers H as fast as it is delivered, the rotation of said holding-levers and the inner casing, E, being in practice made to conform with the speed at which the rods are fed in, as previously stated. Upon each coil being completed it is dropped out of the reel by tilting the levers, and is received upon the chain K, between the spokes $x'$ of plate $x$. Said spokes and plate are then lowered and the chain set in motion, which conveys the coil to one side where required, and thus completing the operation, which is repeated in rapid succession as each wire rod is delivered one after the other to the reel.

In practice the rods would ordinarily be delivered to the reel while in a red-hot state directly from the rolling-mill, the conducting tube or pipe $w$ being extended from one to the other. It is therefore obvious that all liability of accidents to the attendants is entirely removed, and the operation of rolling and reeling or coiling the rods is greatly facilitated over the usual methods employed. The discharge of the coils from the bottom of the reeling-machine does away with the usual lifting devices employed in lifting said coils from the top, thereby lessening the cost of labor and machinery over said old methods, and in consequence reducing the cost of production.

I have shown various ways of making a reeling-machine to produce the same result, (viz., of discharging the coils at the bottom,) as will be observed by reference to Figs. 10 to 18, inclusive, of the drawings.

In said figures I have illustrated only such parts of the machine as relate to the operation of the wire-rod-holding levers, it being unnecessary to show as much of said machine in detail as in the first instance to make clear the nature of my improvements.

Figure 10:
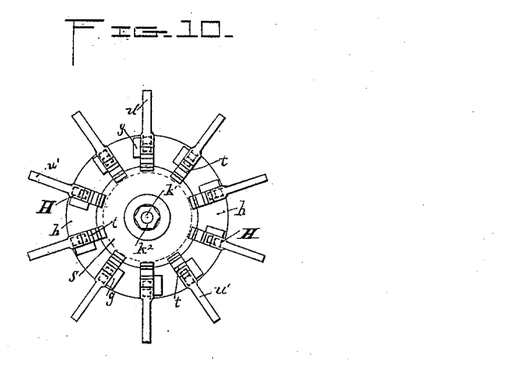
Figure 11:
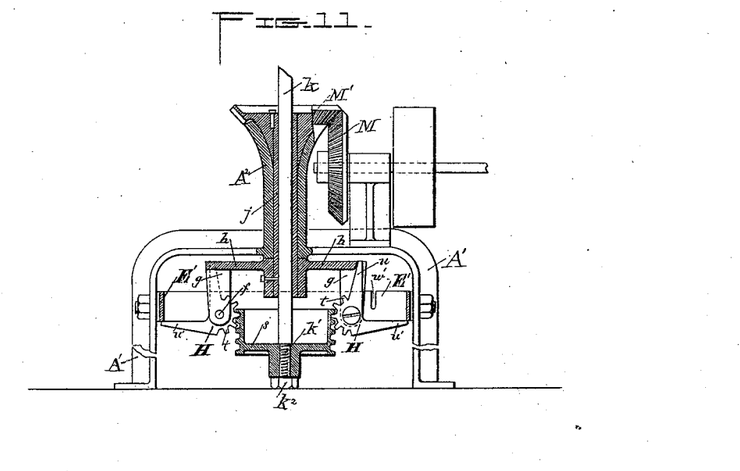

In Figs. 10 and 11 the levers H are constructed, arranged, and operated in substantially the same way as shown by the previous figures, as will be obviously seen, the essential difference in the construction and arrangement of parts relating thereto being that instead of a tight casing, A, being used the various parts are supported by means of an open frame, A', thus exposing the interior to view, and instead of a rotary inner casing, E, being employed a stationary ring or band, E', takes its place, which is secured to said frame A', and provided with a slot or opening, $w'$, through which to pass the wire rod, instead of the conducting-tube $w$, as in the former instance. Another change is in the manner of supporting the shaft $k$ and sleeve $j$ so as to turn, in this instance the friction-wheels being dispensed with and a bearing obtained by enlarging the upper end of said sleeve, and so forming said enlarged part as to turn in a socket corresponding therewith in shape formed at the upper end of the stationary hollow supporting part $A^2$, in which the sleeve turns. Said sleeve and other parts are turned by means of a bevel-gear, M, operated in any well known way, which engages with a bevel-gear, M', formed or secured upon the upper end of the sleeve.

Figure 12:
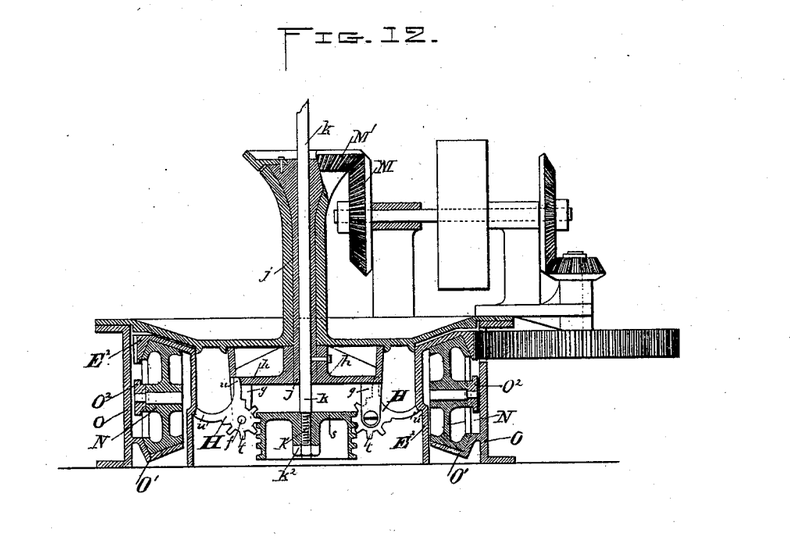
Figure 14:
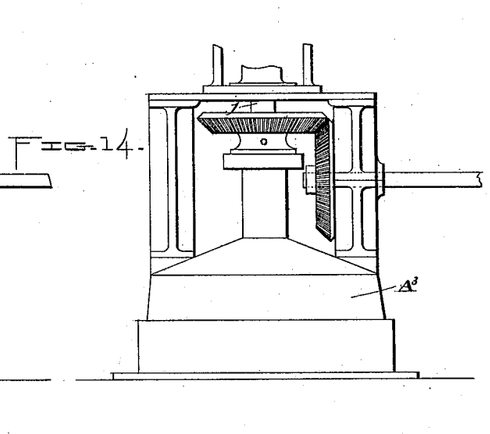

The modifications shown by Figs. 12, 13, and 14 are in some respects like that shown by Figs. 10 and 11. In Fig. 12 the sleeve and shaft are fitted to turn in a like manner, and the only difference in the levers H is that they are curved instead of straight, which, as will be obviously seen, is preferable to having the arms straight when applied in the manner shown in said figure, as the coils are less liable to slip through at the ends than by the use of straight arms. The principal difference between the modification shown by Fig. 12 from that of Figs. 10 and 11 is that a rotary inner casing, $E^2$, is employed instead of a stationary band, as before described. Said inner casing, $E^2$, is supported upon a series of friction-wheels, N, which in turn are supported and fitted to turn upon an inclined or beveled track, O', formed on the stationary part O. The latter coincides with the outer casing, A, of the first-described machine and the casing $E^2$ with casing E. The wheels N are held in their proper relative positions as they travel on the track O' by means of a ring or band, $O^2$, the pivots of the wheels being fastened therein. In other respects the machine is not materially changed from the first-described modification.

In Figs. 13 and 14 the levers are also shown with curved arms; but the rotary inner casing is dispensed with and a tight outer casing, $A^3$, is employed, all being made in one part and extended up around the sleeve $j$ to form a bearing and support for the hub of the driving-gear secured to said sleeve, as is shown in Fig. 13.

Driving-power may be imparted to said gear to turn the sleeve $j$, shaft $k$, and other parts in a similar manner to that employed for turning said parts in the other machines described.

In Figs. 15, 16, 17, and 18 the sleeve and central shaft are supported and turned in a similar manner to the previously-described modifications; but in this instance the levers H, instead of being rocked or partially turned in a vertical direction, are in one case turned a partial revolution horizontally, and in the other case are moved radially or endwise in a horizontal direction toward and from the center of the machine.

The first-described method (shown by Figs. 15 and 16) is carried out in practice in the following manner: Upon the lower end of the sleeve $j$ is secured a hub, P, having radial arms P', extending horizontally therefrom to form bearings for the short vertical journals $P^2$, which are fitted to turn therein. Upon the upper ends of said journals small segment-gears Q are secured, while at their lower ends are secured the segment plates or disks R, which serve the same office as the levers H, for supporting the wire rods in position while being coiled. The finished coils are discharged from the reel by turning said segment-plates a partial revolution—from the position shown by full lines to that shown by dotted lines in Fig. 15—and thus leaving said coils free to drop down past the same and out of the reel.

Figure 15:
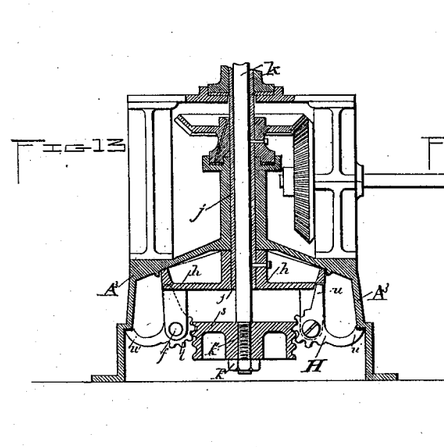
Figure 16:
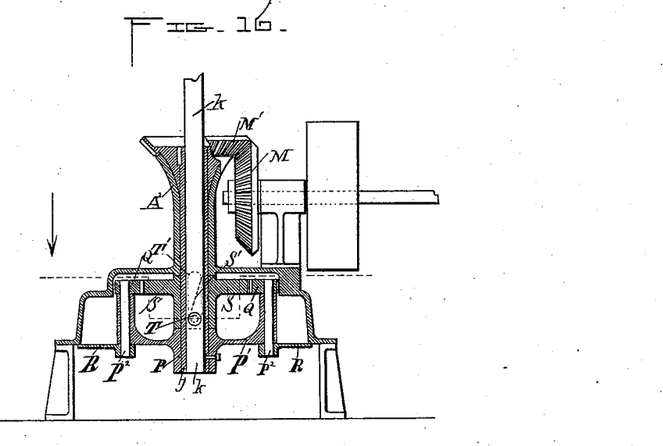

I have shown only one plate turned back by dotted lines; but it will of course be understood that they are all operated at the same time to open the whole circular space free from obstruction to the coil when the latter is ready to be discharged.

Between the hub P and the stationary hollow part in which the sleeve turns is arranged a large spur-gear, S, which is fitted to turn on said sleeve. Its hub is provided with the inclined longitudinal slots, as indicated by dotted lines S' in Fig. 16, and a stud or pin, T, fastened in the central shaft, $k$, is fitted to work up and down in said inclined slots, as well as the vertical slots T', formed in the sleeve. The sleeve and central shaft being fastened to turn together, as previously described, and the gear S fitted to turn independent thereof, as above stated, it is obvious that by raising or lowering the central shaft (which works vertically independent of the sleeve) the pin T, working in the inclined slot, causes said gear S to be turned a partial revolution in one direction or the other, and, consequently, through the small segment-gears Q and vertical journals $P^2$, turning the supporting-plates R in or out, as before specified, according to the direction that the central shaft is moved.

Figure 17:
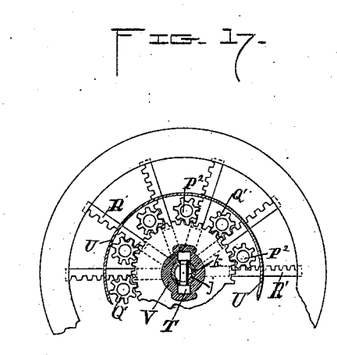
Figure 18:
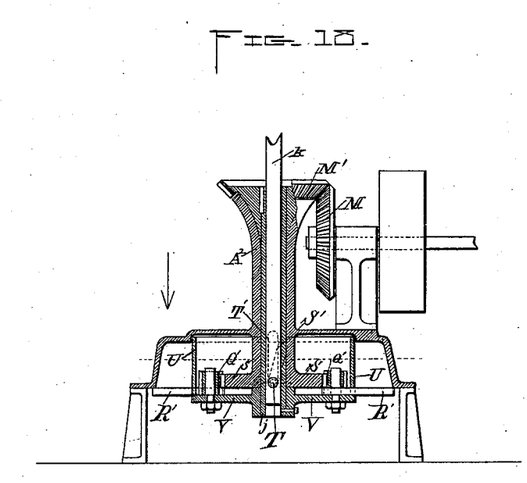

The only essential difference between the construction last described and that shown in Figs. 17 and 18 is that in place of the small segment-gears Q pinions Q' are used and racks R' are employed in lieu of the segment-plates R for supporting the wire-rod coils. In the latter instance said coils are discharged by moving the racks or supports back toward the central shaft by turning the pinions in the same manner previously described for operating the small segment-gears Q. The coils are kept in position laterally upon the inner side while being formed by means of a circular plate, U, fastened to the part V, corresponding to the part P' in Figs. 15 and 16.

The method of swinging the holding-levers in a vertical direction is preferable to the last two methods described, as will at once be seen, for the reason that a more positive and easy action of the parts is produced with less friction against the coil by the former than said last two methods. I reserve the right, however, to accomplish the desired result by either method, or by any equivalent construction and arrangement producing a like result, viz., of operating a series of holding-levers or similar devices, whereby the discharge of the coils may be effected from the bottom of the reeling-machine.

Having described my invention, what I claim therein as new, and desire to secure by Letters Patent, is—

1. In a wire-rod-reeling machine, the method of discharging the completed wire coils from the bottom thereof by dropping down or moving to one side the supports of said wire coils, substantially as shown and described.

2. In a wire-rod-reeling machine, a series of hinged levers or their equivalents arranged in circular form capable of receiving and holding the wire rods as they are delivered thereon and of discharging the same by moving them from one fixed point to another, in combination with means for supporting and operating said hinged parts for keeping the coil within its proper limits laterally and for conducting the rods to the reel, substantially as shown and described.

3. In a wire-rod-reeling machine, the hinged levers H or their equivalents, in combination with means for supporting and operating the same and for keeping the wire rod within its proper limits laterally as it is delivered and coiled upon said hinged parts, substantially as shown and specified.

4. The combination of the hinged levers H with their supporting parts, the corrugated or toothed part $s$, central shaft, $k$, sleeve $j$, and means for operating said shaft and sleeve, substantially as and for the purpose set forth.

5. The hinged levers H or their equivalents, in combination with means for supporting the same, the corrugated or toothed part $s$, central shaft, $k$, sleeve $j$, means for operating said shaft and sleeve and for keeping the wire rod within its proper limits laterally as it is delivered and coiled upon said hinged parts, substantially as shown and described.

6. The hinged levers H or their equivalents, in combination with means for supporting the same, means for conducting the wire rod to the aforesaid hinged parts H and depositing the same in a coil thereon as they are rapidly rotated in a body, means for thus rotating said parts, means for keeping the coil as it is formed within its proper limits laterally, and means for operating the hinged parts to discharge the finished coil, substantially as specified.

7. The hinged levers H, their means of support, the corrugated or toothed part $s$, central shaft, $k$, and means for operating said shaft in a vertical direction, in combination with the inner casing, E, having the slots $v$, means for rotating said casing, the sleeve $j$, means for rotating the same, the conducting-pipe $w$, and means for supporting and inclosing the various parts, substantially as and for the purpose set forth.

8. A wire-rod-reeling machine comprising the hinged levers H or their equivalents, the corrugated or toothed part $s$, shaft $k$, sleeve $j$, means for operating said shaft and sleeve, means for conducting the wire rod to the reel and for keeping it within its proper limits laterally as it is being deposited and coiled, and means for supporting the various parts, in combination with the plate $x$, having the upright spokes $x'$, and operated up and down, substantially as shown and described.

9. A wire-rod-reeling machine comprising the hinged levers H or their equivalents, the corrugated or toothed part $s$, shaft $k$, sleeve $j$, means for operating said shaft and sleeve, means for conducting the wire rod to the reel and for keeping it within its proper limits laterally as it is being deposited and coiled, and means for supporting the various parts, in combination with the carrying-chain K, the plate $x$, having the upright spokes $x'$, and operated up and down, substantially as shown and described.

10. In a wire-rod-reeling machine, the combination of the hinged levers H and means for supporting the same with the corrugated or toothed part $s$, shaft $k$, and means for guiding and operating the same up and down, substantially as set forth.

11. The combination of the hinged levers H with the corrugated or toothed part $s$, shaft $k$, means for operating said parts $s$ and $k$ up and down, sleeve $j$, having the arms $e'$, wheels $C'$, supporting part $l$, spur-gears $F'$ $F^2$, shaft G, and casing I, substantially as set forth.

12. The combination of the hinged levers H and means for supporting and operating the same, with the inner casing, E, provided at its upper outer edge with spur-teeth, also with studs $e$, wheels C, outside frame, A, having the inclined circular track $d$, spur-gear F, shaft G, and cover D, substantially as shown and described.

13. The hinged levers H or their equivalents, means for supporting and operating the same, and means for conducting the wire rods thereto, in combination with means for keeping the rods in position as they are deposited and coiled on said hinged parts, substantially as set forth.

14. Mechanism for rotating the series of hinged levers H, comprising the sleeve $j$, having the hub $h$, hangers $g$, and arms $e'$, wheels $C'$, stationary part $l$, having the inclined circular track $d'$, spur-gears $F'$ $F^2$, and shaft G, in combination with mechanism for tilting said levers in a vertical direction, comprising the corrugated or toothed part $s$, shaft $k$, means for operating said shaft up and down and for supporting the various parts in position, substantially as and for the purpose set forth.

HORACE A. YOUNG.

Witnesses:
ALBERT A. BARKER,
WALTER B. NOURSE.